Dec. 3, 1968  H. FLEISSNER  3,413,731
APPARATUS FOR THE HEAT-TREATMENT OF MATERIALS OF ALL KINDS
Filed Nov. 10, 1966  2 Sheets-Sheet 1

*Inventor:*
HEINZ FLEISSNER
BY Dicke + Craig
ATTORNEYS

Dec. 3, 1968  H. FLEISSNER  3,413,731
APPARATUS FOR THE HEAT-TREATMENT OF MATERIALS OF ALL KINDS
Filed Nov. 10, 1966  2 Sheets-Sheet 2
Fig. 4
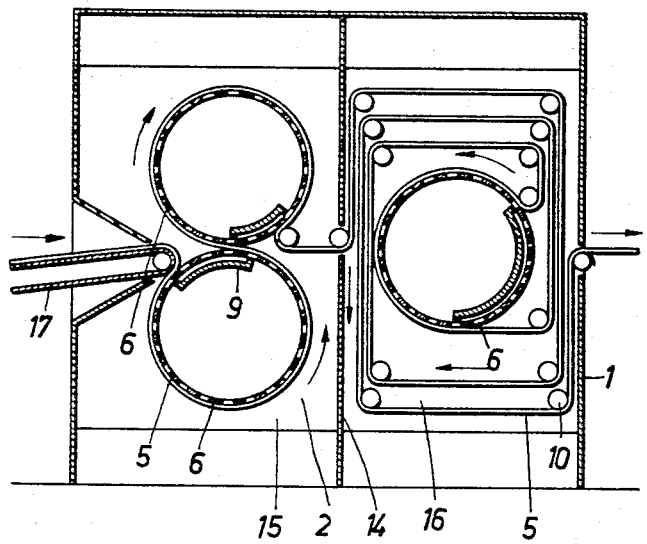
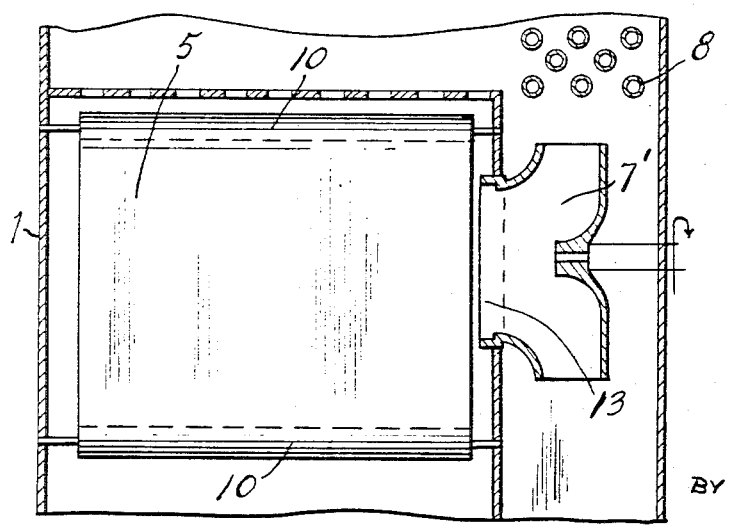
Fig. 5.
Inventor:
HEINZ FLEISSNER
BY Dicke + Craig
ATTORNEYS

United States Patent Office 3,413,731
Patented Dec. 3, 1968

3,413,731
APPARATUS FOR THE HEAT-TREATMENT
OF MATERIALS OF ALL KINDS
Heinz Fleissner, Egelsbach, near Frankfurt am Main,
Germany, assignor to VEPA A.G., Basel, Switzerland
Filed Nov. 10, 1966, Ser. No. 593,343
Claims priority, application Germany, Nov. 10, 1965,
A 50,819
16 Claims. (Cl. 34—115)

ABSTRACT OF THE DISCLOSURE

The present disclosure is directed to an apparatus for the heat-treatment of textile materials. The heat-treating apparatus of the present disclosure comprises a substantially closed housing defining a rapid heating-up zone and a final treatment zone, at least one sieve drum means rotatably disposed in said rapid heating-up zone, inlet means for introducing the material to be heat-treated to said sieve drum means, fan means communicating with the interior of the sieve drum means, heating means associated with the sieve drum means and provided in the circulation of the treatment medium, a plurality of roller means disposed in the final treatment zone to provide for extended passage of the material being treated and outlet means for removing the heat-treated material from the final treatment zone.

The present invention relates to an apparatus for the heat-treatment, for example, for polymerizing and curing materials impregnated with synthetic resins and for steaming hank-type and lengths of materials of all kinds, particularly textile materials. More particularly, the present invention concerns an apparatus wherein the materials to be treated are heated to the treatment temperature by convection of a gaseous treatment medium, and maintained at that temperature.

In the case of textile materials, such as fabrics, knit goods, nonwovens, needed felt materials, flocked materials, air permeable materials, and the like, which are impregnated with synthetic resins, heat treatment at temperatures of, for example, about 130 to 150° C. and dwelling or residence times of several minutes are required for polymerizing and curing the synthetic resin. The material to be treated can be heated to the treatment temperature and maintained at that temperature during treatment by radiation heat, by direct contact heat, or by convection of a gaseous treatment medium. In general, heat transfer by convection is preferred because the danger of local over-heating of the material is reduced and because such devices can generally operate more economically.

In the known devices for such heat treatments, such as a hotflue, a festoon dryer, a material store with spiral or double-spiral material guidance, and the like, a relatively large quantity of material is accommodated in the treatment chamber of the apparatus and the material is passed continuously through said treatment chamber. In general, the heat supply is effected by the parallel ventilation of the material with heated air, said material being guided in a loop-like fashion, or in the form of a spiral.

In heat treating various types of materials, the relative long dwelling times at high temperatures are often undesirable, especially when treating textile materials where certain fiber properties, for example, fiber strength, deteriorate and become reduced under the extended influence of high temperatures. In some situations, a considerable reduction of the treatment time can be achieved, if the material is ventilated by means of jets and especially using devices which subject said drums to a suction draft.

Such devices have recently been used to an increasing extent, especially where high quality requirements were established for the material to be processed. However, these devices are large and require correspondingly more space.

An object of the present invention is to avoid the disadvantages of the prior art heat treatment processes and apparatus.

Another object of the present invention is to provide an improved apparatus for heat-treating various types of materials, for example, textile materials, by reducing the manufacturing and operating costs of the treatment apparatus and by reducing the residence time the materials spend in the heat-treating apparatus.

Other objects and further scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

In accordance with the present invention, it has been found that shorter dwelling times when using a sieve drum dryer system with sieve drums subjected to a suction draft can be achieved, by reducing the time required for heating the material to the treatment temperature. Whereas in the usual curing machines, heating times of at least about one to two minutes are required for heavier materials before the treatment temperature is reached, in a sieve drum dryer this heating time amounts only to a few seconds. Thus, according to the present invention, a gaseous treatment medium is drawn through the material to be treated during the heating-up stage of the process in order to effect a rapid heating-up of the material to be processed, and then the material is passed through a moving, treatment atmosphere. Advantageously, the treatment medium has a higher temperature in the heating up zone than in the dwelling zone.

An apparatus which is effective in carrying out the process of the present invention comprises the combination of a sieve drum dryer and a material store containing continuous material passage. In using the apparatus of the present invention which is short in length and thus requires less space than prior art devices, short treatment times can be achieved. In a further embodiment of the present invention, a hotflue or a festoon dryer can be connected as a material store behind the sieve drum dryer. A hotflue is a heat-treatment chamber wherein the web-shaped material to be treated is suspended in loops which extend to the vicinity of the floor of the treatment chamber. With progressive treatment, the material being treated travels over the rolls and is continuously formed into new loops, these loops being created by the weight of the material. However, the feature which is particularly characteristic of the hotflue is the construction of the air-conducting and heating system which is similar to the treatment chamber of a regular perforated drum drier. That is, a fan is arranged in the side wall of the chamber of the suspension drier which draws in the air between the suspended loops and conveys it upwardly to heating vanes from where the heated air again flows back to the loops where it is again drawn in by the fan. This cycle differs from that of a perforated drum drier only in that the suction effect necessary for maintaining the material to be dried on the perforated drums is not necessary in the hotflue. The hotflue functions as a material store since it is disposed immediately adjoining the treatment chamber containing the perforated sieve drums and because the material being treated is exposed to the treatment medium over a longer period of time and in a small quantity. A material store can also be called a processing chamber, a gradual treatment chamber, a storage and a processing chamber, a final treatment chamber, a curing unit, or the like. It is often advantageous to guide the material in the material store in a spiral or double spiral and to provide a sieve drum subjected to a suction draft as a reversing roll in the spiral.

In the apparatus according to the present invention, the treatment medium is drawn through the material at a high speed during the heating-up period so that shock-heating is effected. In contrast thereto, during the dwelling time only relatively small quantities of the treatment medium are supplied to the material, as the air circulated by the fan correlated to the sieve drums which served as a reversing roll is forced to penetrate the treatment material several times or to flow around it before the air enters the sieve drum.

In another embodiment of the present invention, a radial fan wheel can be utilized in the material store area to obtain a circulation of the air and/or the treatment medium in the material store. However, this fan for the material store can be dispensed with if the fans correlated to the sieve drums, and especially the fans correlated to the last sieve drum discharge at least part of the air into the material store where it is circulated and drawn off by the sieve drums, especially by the last sieve drum and supplied to the fans, anew.

The present invention will become fully understood from the detailed description hereinbelow and the accompanying drawings which are given for purposes of illustration only and thus are not limitative of the present invention and wherein, FIGURE 1 is a longitudinal section of the apparatus according to the present invention;

FIGURE 4 is a longitudinal section of a further embodiment of the apparatus according to the present invention, and FIGURE 5 is a section taken along line C—C of FIGURE 3 of the material storage zone disposed after the sieve drums.

Figure 1:
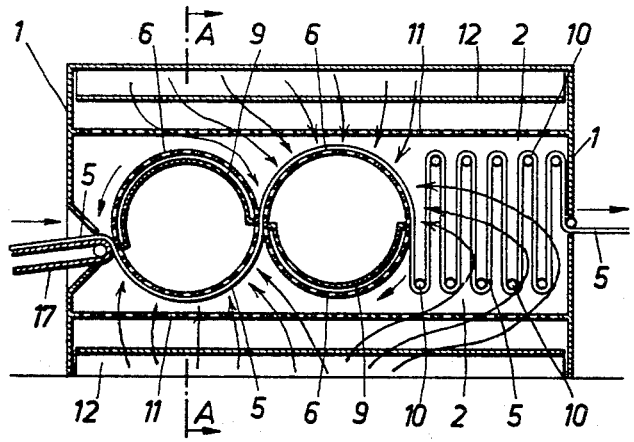
Figure 2:
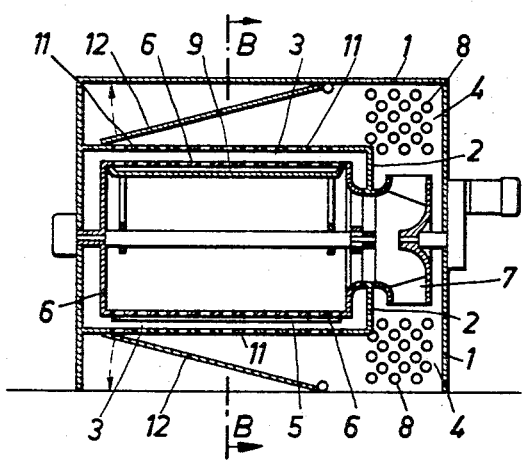
FIGURE 2 is a cross-sectional view taken along line A—A of the apparatus of FIGURE 1 according to the present invention.

Referring now to the drawings wherein like reference numerals are used throughout the various views to designate like parts, the apparatus of the present invention comprises a closed, heat-insulated housing 1, which is subdivided by means of a partition 2 into a treatment chamber 3 and a fan chamber 4. A conveyor belt 17 serves for feeding hank-type or length of material 5 to be treated into the apparatus, as shown. Instead of a conveyor belt, a pair of intake rollers (not shown) alternatively may be used. Two sieve drums 6, which are subjected to a suction draft, are provided at the inlet of the treatment chamber for a rapid heating-up of the material to be treated. However, the invention is not limited to the use of two sieve drums subjected to a suction draft, but, depending upon the required speeds of the material passage, only one sieve drum subjected to a suction draft or more than two sieve drums subjected to a suction draft may be used. The suction draft is produced by fans 7 which are correlated to the faces of the sieve drums. The fans draw the treatment medium in a known matter out of the sieve drums and return it to the treatment chamber over heaters 8. The suction draft is interrupted by means of baffles 9 on those portions of the sieve drums which are not covered with material to be treated.

Using the suction draft, large quantities of the treatment medium are passed through the material to be processed, and the material is heated, shock-like, to the treatment temperature. Thus during the treatment proper it is only necessary to maintain the treatment temperature of the material and therefore it is sufficient to supply smaller quantities of the treatment medium to the material. In general, a moving treatment atmosphere will suffice. In many treatment processes, for example, when curing and polymerizing synthetic resins, a certain residence time at the treatment temperature is generally necessary. In accordance with the present invention, the material to be treated can be guided loop-like, or in spirals or in any other suitable way during further processing, thereby permitting the accommodation of large material quantities in a small amount of space.

Referring to FIGURE 1, two rows of rollers 10 are provided behind the two sieve drums over which the material is passed in a serpentine fashion. Above and below the sieve drums and the rollers are provided sieve sheets 11. The air withdrawn by the fans in the two sieve drums is returned over the whole length of the apparatus into the treatment chamber, where it is deflected by oblique bottoms 12 and blown against the material in the treatment chamber through the sieve sheets. A certain amount of the treatment medium is thereby constantly blown against the serpentine-like guided material in that zone of the apparatus adjoining the outlet and also drawn off by the sieve drums so that also in that zone, the material constantly comes in contact with the treatment medium and is maintained at the treatment temperature by the treatment medium.

When heavy materials or materials which are only slightly permeable to air are being treated, a special radial fan may be provided in the fan 7' chamber for the outlet zone of the apparatus. This fan draws the treatment medium through an opening 13 in partition 2, between the serpentine-like guided material 5, and returns it into the treatment chamber above and below the material.

Figure 3:
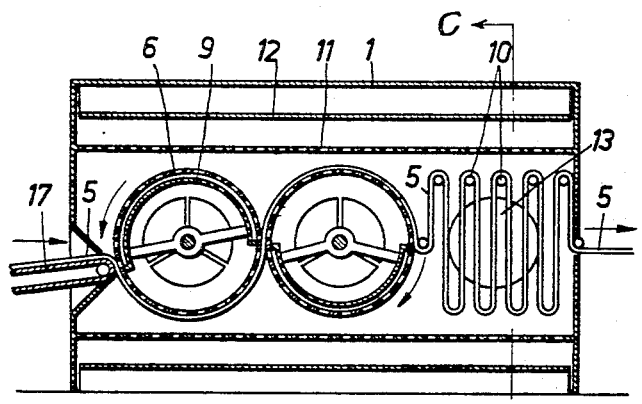
FIGURE 3 is a longitudinal section of another embodiment of the apparatus according to the present invention.

In the apparatus according to FIGURE 3, only one upper row of rollers is provided instead of two rows of rollers. The rollers are generally driven at the same circumferential speed as the sieve drums. Instead of the rollers, a revolving, endless conveying element consisting of two lateral conveying chains and rods arranged at a certain distance between the conveying chains can also be used, similarly as in a festoon dryer.

In the apparatus according to FIGURE 4, the treatment chamber and the fan chamber are subdivided by a partition 14 to a heating-up zone 15 and a dwelling zone 16. The subdivision offers the advantage that the temperature of the treatment medium in the heating-up zone and in the dwelling zone may differ. According to the present invention, the temperature in the heating-up zone should be higher than the temperature in the dwelling zone in order to heat the material to the treatment temperature more rapidly. In the apparatus according to FIGURE 4, two sieve drums are arranged one above the other. This offers the advantage that the two sieve drums are in substantial contact with the material being treated. In the dwelling zone, the material to be treated is guided in the form of a double spiral on rollers 10. For deflecting the material in the double spiral, a sieve drum subjected to a suction draft is used. This manner of material guidance is especially advantageous since it offers the advantage that the treatment medium is also drawn through the material in the dwelling zone. Thus, in one circulation cycle, the treatment medium is passed through the material to be processed, several times. Owing to the increased resistance offered by the several layers of material, only a relatively small amount of the treatment medium is circulated. However, this quantity fully suffices for maintaining the treatment temperature properly and in substantial contact with the material. Using the apparatus of the present invention, substantially uniform treatment and thus a particularly good material product can be produced.

The heat-treatment temperatures and times will vary depending upon the particular materials to be heat-treated and the desired results.

Since modifications of this invention will be apparent to those skilled in the art, it is not desired to limit the invention to the exact constitution shown and described. Accordingly, all suitable modifications and equivalents may be resorted to which fall within the scope of the appended claims.

It is claimed:

1. A heat-treating apparatus which comprises a substantially closed housing defining a rapid heating-up zone and a final treatment zone, at least one sieve drum means rotatably disposed in said rapid heating-up zone, inlet means for introducing the material to be heat-treated to said sieve drum means, fan means communicating with the interior of the sieve drum means, heating means associated with the sieve drum means and provided in the circulation of the treatment medium, a plurality of roller means disposed in the final treatment zone to provide for extended passage of the material being treated and outlet means for removing the heat-treated material from the final treatment zone.

2. The apparatus of claim 1, wherein the roller means are disposed in two substantially parallel rows for directing the material being treated in a serpentine fashion.

3. The apparatus of claim 1, wherein the roller means are disposed in one row for directing the material being treated in a suspended loop arrangement.

4. The apparatus of claim 1, wherein the final treatment zone is divided by a partition means into a treatment chamber and into a fan chamber, said roller means being disposed in the treatment chamber and said partition means containing an opening therein.

5. The apparatus of claim 4, wherein the opening in the partition means is provided with radial fan means which draws the treatment medium through said opening and returns it to the treatment chamber.

6. The apparatus of claim 1, wherein the roller means direct the material in a double spiral fashion, a sieve drum means subjected to a suction draft being provided as the reversing roll therefore.

7. The apparatus of claim 1, wherein the fan means discharge at least part of the treatment medium into the final treatment zone from where it is drawn through the sieve drum means and returned to the fan means.

8. A heat-treating apparatus which comprises a substantially closed housing defining a rapid heating-up zone and a final treatment zone, at least one sieve drum means rotatably disposed in said rapid heating-up zone, said sieve drum means provided with a fan means disposed at one end of the sieve drum means and communicating with the interior of the sieve drum means, inlet means for introducing the material to be heat-treated to the sieve drum means, heating means associated with the sieve drum means and provided in the circulation of the treatment medium, a plurality of roller means disposed in the final treatment zone to provide for extended passage of the material being treated, sieve sheet means disposed above and below the sieve drum means and the roller means, partition means dividing the housing into a treatment chamber containing the sieve drum means and fan chamber containing the fan means, said partition means extending to the sieve sheet means, and outlet means for removing the heat-treated material from the final treatment zone.

9. The apparatus of claim 8, wherein the roller means are disposed in two substantially parallel rows for directing the material being treated in a serpentine fashion.

10. The apparatus of claim 8, wherein the roller means are disposed in one row for directing the material being treated in a suspended loop arrangement.

11. The apparatus of claim 8, wherein the partition means in the final treatment zone contains an opening which is provided with radial fan means which draws the treatment medium through said opening and returns it to the treatment chamber.

12. The apparatus of claim 11, wherein heating means are associated with the radial fan means.

13. The apparatus of claim 8, wherein baffle means are disposed above and below the sieve sheets and extend from the housing wall near the fan chamber toward the sieve sheets in the treatment chamber.

14. A heat-treating apparatus which comprises a substantially closed housing, wall means substantially dividing said housing into a rapid heating-up zone and a final treatment zone, at least two sieve drum means rotatably disposed in said rapid heating-up zone, one above the other, inlet means for introducing the material to be heat-treated to said sieve drum means, fan means communicating with the interior of the sieve drum means, heating means associated with the sieve drum means and provided in the circulation of the treatment medium, a plurality of roller means disposed in the final treatment zone in such a way that the material being treated is directed in a double spiral fashion, a sieve drum means subjected to a suction draft being provided as the reversing roll therefor, means for conveying the material through the wall means from the rapid heating-up zone to the final treatment zone and outlet means for removing the heat-treated material from the final treatment zone.

15. The apparatus of claim 14, wherein in the final treatment zone converging groups of roller means substantially surround the sieve drum means.

16. A heat-treating apparatus which comprises a substantially closed housing, at least one cylindrical sieve drum means rotatably disposed within said housing and defining an annular space surrounding said cylinder sieve drum, the cylindrical surface of said sieve drum serving as a conveying means, inlet means for introducing the material to be heat-treated to said conveying means, fan means communicating with the interior of the cylindrical sieve drum for directing a heat-treatment medium from the inside of said drum to the annular space surrounding said drum, heating means provided within the circulation of the treatment medium, means for delivering the material being treated from the sieve drum to a dwelling zone within said housing, said dwelling zone being provided with means for directing the material being treated in a double spiral fashion, a sieve drum subjected to a suction draft being provided as the reversing roll therefor and outlet means for removing the heat-treated material from the material store.

References Cited

UNITED STATES PATENTS

| | | | |
|---|---|---|---|
| 1,287,172 | 12/1918 | Andrews | 34—157 |
| 1,315,377 | 9/1919 | McGiehan | 34—159 XR |
| 1,996,020 | 3/1935 | Hurxthal | 34—157 XR |
| 2,218,677 | 10/1940 | Haas | 34—157 XR |
| 3,011,266 | 12/1961 | Fleissner | 34—115 XR |
| 3,065,551 | 11/1962 | Cohn et al. | |
| 3,066,517 | 12/1962 | Deyber | 68—5 |

FOREIGN PATENTS

| | | |
|---|---|---|
| 1,323,405 | 2/1963 | France. |

FREDERICK L. MATTESON, Jr., *Primary Examiner.*

A. D. HERRMANN, *Assistant Examiner.*